United States Patent
Zhao

(10) Patent No.: US 12,466,169 B2
(45) Date of Patent: Nov. 11, 2025

(54) MONOLITHIC BREATHABLE FILM AND COMPOSITE MANUFACTURED THEREFROM

(71) Applicant: AVINTIV Specialty Materials Inc., Charlotte, NC (US)

(72) Inventor: Rongguo Zhao, Mooresville, NC (US)

(73) Assignee: AVINTIV Specialty Materials Inc., Charlotte, NC (US)

( * ) Notice: Subject to any disclaimer, the term of this patent is extended or adjusted under 35 U.S.C. 154(b) by 161 days.

(21) Appl. No.: 17/981,589

(22) Filed: Nov. 7, 2022

(65) Prior Publication Data

US 2023/0062656 A1 Mar. 2, 2023

Related U.S. Application Data

(62) Division of application No. 14/972,944, filed on Dec. 17, 2015, now Pat. No. 11,524,488.

(Continued)

(51) Int. Cl.
*B32B 27/08* (2006.01)
*B29C 48/08* (2019.01)
(Continued)

(52) U.S. Cl.
CPC ............. *B32B 27/08* (2013.01); *B29C 48/08* (2019.02); *B29C 48/16* (2019.02); *B29C 48/18* (2019.02);
(Continued)

(58) Field of Classification Search
None
See application file for complete search history.

(56) References Cited

U.S. PATENT DOCUMENTS

| 3,870,593 A | 3/1975 | Elton et al. |
| 6,072,005 A | 6/2000 | Kobylivker et al. |

(Continued)

FOREIGN PATENT DOCUMENTS

| CN | 1285855 A | 2/2001 |
| CN | 1414900 A | 4/2003 |

(Continued)

OTHER PUBLICATIONS

Machine English translation of EP1250225, Accessed Aug. 8, 2024 (Year: 2005).*

(Continued)

*Primary Examiner* — Abbas Rashid
*Assistant Examiner* — Adrianna N Konves
(74) *Attorney, Agent, or Firm* — BURR & FORMAN

(57) ABSTRACT

Breathable multilayer films suitable for a wide variety of uses (e.g., protective apparel, surgical gowns, surgical drapes, aprons, roofing material, house wrap, etc.) are disclosed. The breathable multilayer film may include a monolithic core layer. The monolithic core layer may comprise at least one highly breathable polymer. The breathable multilayer film may also include at least one skin layer. The skin layer or layers may comprise at least one highly breathable polymer, a filler, and a non-breathable material. An exemplary structure of the breathable multilayer film provides a monolithic core layer, a first skin layer on one side of the monolithic core layer, and a second skin layer on the other side of the monolithic core layer. An exemplary construction of one or both of the skin layers includes one or more highly breathable polymers, a filler, and a non-breathable material. The filler, for example, may comprise calcium carbonate.

15 Claims, 4 Drawing Sheets

Related U.S. Application Data

(60) Provisional application No. 62/094,108, filed on Dec. 19, 2014.

(51) Int. Cl.

| | | |
|---|---|---|
| *B29C 48/16* | (2019.01) | |
| *B29C 48/18* | (2019.01) | |
| *B32B 3/30* | (2006.01) | |
| *B32B 5/02* | (2006.01) | |
| *B32B 7/12* | (2006.01) | |
| *B32B 27/12* | (2006.01) | |
| *B32B 27/20* | (2006.01) | |
| *B32B 27/28* | (2006.01) | |
| *B32B 27/32* | (2006.01) | |
| *B32B 27/34* | (2006.01) | |
| *B32B 27/36* | (2006.01) | |
| *B32B 27/40* | (2006.01) | |
| *B32B 37/15* | (2006.01) | |
| *C08L 67/00* | (2006.01) | |
| *C08L 75/04* | (2006.01) | |
| *C08L 77/00* | (2006.01) | |

(52) U.S. Cl.
CPC ............... *B32B 3/30* (2013.01); *B32B 5/022* (2013.01); *B32B 5/024* (2013.01); *B32B 7/12* (2013.01); *B32B 27/12* (2013.01); *B32B 27/20* (2013.01); *B32B 27/285* (2013.01); *B32B 27/32* (2013.01); *B32B 27/34* (2013.01); *B32B 27/36* (2013.01); *B32B 27/40* (2013.01); *B32B 37/15* (2013.01); *C08L 67/00* (2013.01); *C08L 75/04* (2013.01); *C08L 77/00* (2013.01); *B32B 2250/24* (2013.01); *B32B 2250/40* (2013.01); *B32B 2264/02* (2013.01); *B32B 2264/04* (2013.01); *B32B 2264/067* (2013.01); *B32B 2264/10* (2013.01); *B32B 2270/00* (2013.01); *B32B 2307/724* (2013.01); *B32B 2307/7242* (2013.01); *B32B 2307/7265* (2013.01); *B32B 2535/00* (2013.01)

(56) References Cited

U.S. PATENT DOCUMENTS

| | | |
|---|---|---|
| 6,191,221 B1 | 2/2001 | McAmish et al. |
| 6,261,674 B1 | 7/2001 | Branham et al. |
| 6,479,154 B1 | 11/2002 | Walton et al. |
| 6,703,115 B2 | 3/2004 | Hale et al. |
| 2002/0107295 A1* | 8/2002 | Edmundson .......... C08L 101/00 521/50 |
| 2004/0170852 A1* | 9/2004 | Gustafson ................ B32B 5/18 428/500 |
| 2006/0147716 A1 | 7/2006 | Braverman et al. |
| 2008/0108263 A1 | 5/2008 | Conley et al. |
| 2012/0288695 A1 | 11/2012 | Jenkins |
| 2012/0328841 A1 | 12/2012 | Afshari |
| 2014/0030495 A1 | 1/2014 | Cartier et al. |
| 2014/0212646 A1 | 7/2014 | Miyaguchi et al. |
| 2014/0242372 A1 | 8/2014 | Funatsu et al. |

FOREIGN PATENT DOCUMENTS

| | | | |
|---|---|---|---|
| CN | 103492461 A | 1/2014 | |
| EP | 1250225 B1 * | 8/2005 | ............ B32B 25/08 |
| EP | 3233470 B1 | 1/2020 | |
| JP | H08337974 A | 12/1996 | |
| JP | H11138673 A | 5/1999 | |
| JP | 2002061009 A | 2/2002 | |
| JP | 2002347184 A | 12/2002 | |
| JP | 2009506198 A | 2/2009 | |
| JP | 2014514976 A | 6/2014 | |

OTHER PUBLICATIONS

Machine English translation of JP2002061009, Accessed Aug. 8, 2024 (Year: 2002).*
International Search Report and Written Opinion of corresponding international application No. PCT/US2015/066435 mailed on Mar. 11, 2016, all enclosed pages cited.
Second Written Opinion of the International Preliminary Examining Authority of corresponding international application No. PCT/US2015/066435 mailed on Jan. 19, 2017, all enclosed pages cited.
International Preliminary Report on Patentability of corresponding international application No. PCT/US2015/066435 mailed on Apr. 4, 2017, all enclosed pages cited.
Office Action of corresponding Colombian Application No. NC2017/0006549 mailed Jul. 10, 2018, all enclosed pages cited.
Office Action of corresponding Chinese Application No. 201580069503.7 mailed Aug. 27, 2018, all enclosed pages cited.
Office Action of corresponding Japanese Application No. 2017-532999 mailed Nov. 5, 2019, all enclosed pages cited.
English Translation of Office Action issued in corresponding Japanese Application No. 2017-532999 on Nov. 5, 2019, all enclosed pages cited.
Notification of Reasons for Refusal issued in corresponding Japanese Application No. 2017-532999 on Aug. 4, 2020, all enclosed pages cited.

* cited by examiner

MONOLITHIC BREATHABLE FILM AND COMPOSITE MANUFACTURED THEREFROM

TECHNICAL FIELD

The presently-disclosed invention relates generally to single and multilayer breathable films and composites comprising the same. The single and multilayer breathable films of the invention can be adhered to fibrous layers to form a laminate having various commercial applications.

BACKGROUND

During surgery, surgeons, nurses, and patients all require protective barriers preventing contact with bodily fluids, chemicals, and infective agents. However, these protective barriers must also be breathable to allow transpiration to evaporate in order to keep the wearer comfortable.

Microporous films have conventionally been used as breathable films due to good porosity and water vapor absorption or transmission. Microporous films are well known for their use in various applications, typically where liquid barriers and moisture permeability are required. However, microporous films have limited utilities, for example, due to poor blood and viral penetration resistance. Furthermore, microporous films tend to have a higher basis weight than monolithic breathable films in order to provide good liquid penetration resistance. As a result, microporous films may suffer from a loss of drapability. Additionally, microporous film breathability is dependent on the formation of a tortuous porous path throughout the film. Furthermore, the barrier properties of such microporous films are affected by the surface tension of the liquid to which they are exposed (e.g., they are more easily penetrated by isopropyl alcohol than by water), and they transmit odor more easily than solid films.

Monolithic films, however, are continuous and free of pores. Monolithic breathable films are capable of absorbing gas and water molecules on one surface, transferring the molecules through the film, and releasing the molecules on the opposite surface. Monolithic films have an advantage over microporous films in that the monolithic film's ability to serve as a liquid barrier is independent of the surface tension of the liquid to which the film is exposed. For example, a monolithic film's liquid barrier properties would not be substantially affected by the introduction of a surfactant, which would cause the monolithic film's surface to become hydrophilic. On the other hand, using surfactant solutions or other low surface tension liquids on a microporous film may reduce the liquid penetration resistance by depressing the liquid pressure needed to counter capillary pressure. The low surface tension solutions include but are not limited to medical prep solutions, cleaning sprays, disinfecting solutions, etc.

Several thermoplastic resins are currently available for the extrusion of monolithic films having a high moisture vapor transmission rate (MVTR) that can be extruded on a porous support substrate such as a woven or nonwoven fabric. However, for some applications it is desirable to produce the monolithic breathable film separately and to combine it with other webs in a subsequent process to form a laminate because these laminates are often less prone to having pinholes. Nevertheless, this approach often produces a laminate that is bulkier and softer than laminates produced by direct extrusion of the film on one web or as a tie layer between two webs. Additionally, when stand-alone films are glued to nonwovens, the laminate may experience a loss of glue adhesion when the breathable hygroscopic films absorb moisture. Furthermore, the use of stand-alone films gives rise to the tendency of those films to block (i.e., to be difficult to unwind without experiencing tearing). Such a stand-alone film also tends to have a high coefficient of friction when sliding against itself or another surface. A high coefficient of friction can be problematic during the converting process or when the film is used as a facing layer of a laminate.

Therefore there at least remains a need in the art for a film that is monolithic, highly breathable, and that can be converted easily due to its low tendency to block and its low coefficient of friction. Furthermore, there remains a need in the art for a laminate made by gluing the film to a web that would maintain good adhesion between the film and the web even when the laminate is exposed to water and the film becomes hydrated.

BRIEF SUMMARY

One or more embodiments of the invention may address one or more of the aforementioned problems. Certain embodiments according to the invention provide breathable multilayer films suitable for a wide variety of uses (e.g., protective apparel, surgical gowns, surgical drapes, aprons, roofing material, house wrap, etc.). In one aspect, the breathable multilayer film includes a monolithic core layer. The monolithic core layer may comprise at least one core-layer highly breathable polymer. The breathable multilayer film also may comprise at least one skin layer. The skin layer(s) may comprise at least one highly breathable polymer, a filler, and a non-breathable material.

In accordance with certain embodiments, the breathable multilayer film includes a monolithic core layer with a top surface and a bottom surface, a first skin layer positioned above and directly adjacent to the top surface of the core layer, and a second skin layer positioned below and directly adjacent to the bottom surface of the core layer. The monolithic core layer may comprise from about 50 wt. % to about 100 wt. % of one or more hygroscopic highly breathable polymers. Each skin layer has a given thickness and may comprise from about 80 wt. % to about 98 wt. % of at least one highly breathable polymer, about 1 wt. % to about 40 wt. % of a filler, and about 0.2 wt. % to about 10 wt. % of at least one non-breathable material. Furthermore, the filler in each skin layer may include particles or aggregates of particles in which the median filler particle diameter is greater than the respective skin layer thickness and the filler particles or aggregates of filler particles define a plurality of protrusions on an outer surface of each skin layer.

In certain embodiments of the invention, the breathable film layer is a single layer film comprising from about 90 wt. % to about 95 wt. % of one or more highly breathable polymers; from about 3 wt. % to about 5 wt. % of one or more non-breathable polymers; and a releasing agent. According to an embodiment of the invention, the highly breathable polymer is hygroscopic. In certain embodiments of the invention, the breathable single layer film may additionally comprise from about 1 wt. % to about 2 wt. % of a color masterbatch.

In another aspect, a laminate may be formed. The laminate may comprise a breathable multilayer film and at least one fibrous layer.

In another aspect, certain embodiments of the invention provide a process for forming a breathable multilayer film.

The process may comprise co-extruding a multilayer film according to certain embodiments of the invention.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

DETAILED DESCRIPTION

Figure 1:
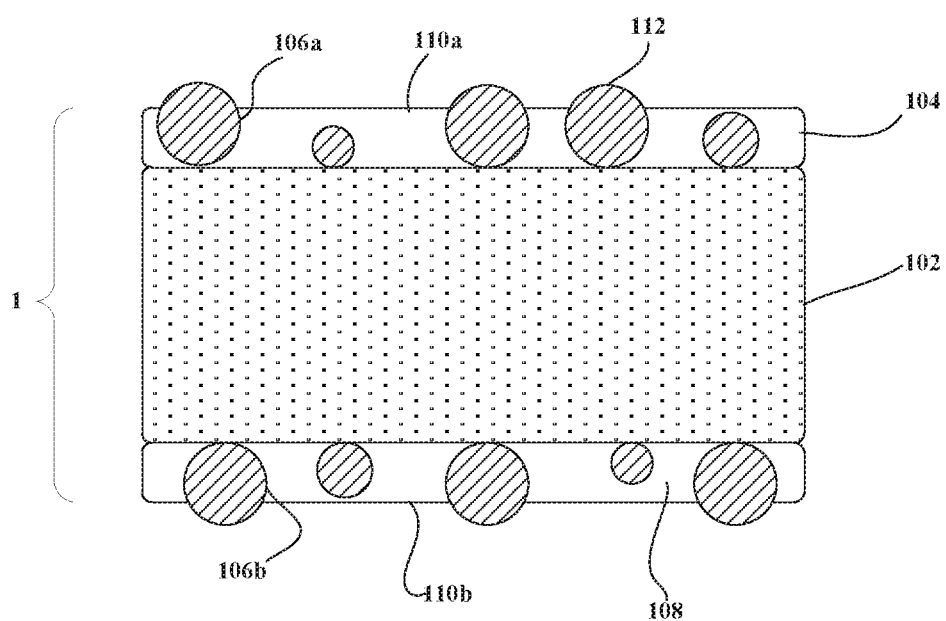
FIG. 1 illustrates a cross sectional view of a breathable multilayer film according to an embodiment of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention includes a highly breathable monolithic film that also exhibits a low tendency to block when wound into a roll and a low coefficient of friction. The invention also includes a laminate incorporating the highly breathable monolithic film according to certain embodiments of the invention and a process for forming the highly breathable monolithic film according to certain embodiments of the invention.

As used herein, the term "monolithic" film may comprise any film that is continuous and substantially free or free of pores. In certain alternative embodiments of the invention, a "monolithic" film may comprise fewer pore structures than would otherwise be found in a microporous film. According to certain non-limiting exemplary embodiments of the invention, a monolithic film may act as a barrier to liquids and particulate matter but allow water vapor to pass through. In addition, without intending to be bound by theory, by achieving and maintaining high breathability, it is possible to provide an article that is more comfortable to wear because the migration of water vapor through the laminate helps reduce and/or limit discomfort resulting from excess moisture trapped against the skin. Thus, such an article can potentially contribute to an overall improved skin wellness. Monolithic films, according to certain embodiments of the invention, may also act as barriers to bacteria and viruses and may provide an article or garment that reduces the contamination of the surroundings and the spread of infections and illness caused by the bacteria and viruses.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers: stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material.

The term "highly breathable polymer", as used herein, may comprise any polymer that is selectively permeable to water vapor but substantially impermeable to liquid water and that can form a breathable film. Specifically, according to certain embodiments of the invention, "highly breathable polymer" may comprise any thermoplastic polymer having a MVTR of at least 800 g/m$^2$/day or at least 1000 g/m$^2$/day when formed into a film, such as a film having, for example, a thickness of about 25 microns or less. According to certain embodiments of the invention, highly breathable polymers may comprise, for example, any one or combination of a polyether block amide copolymer (e.g., PEBAX® from Arkema Group), polyester block amide copolymer, copolyester thermoplastic elastomer (e.g., ARNITEL® from DSM Engineering Plastics, HYTREL® from E.I. DuPont de Nemours and Company), or thermoplastic urethane elastomer (TPU).

The term "filler", as used herein, may comprise particles or aggregates of particles and other forms of materials that can be added to a polymeric film blend. According to certain embodiments of the invention, a filler will not substantially chemically interfere with or adversely affect the extruded film. According to certain embodiments of the invention, the filler is capable of being uniformly dispersed throughout the film or a layer comprised in a multilayer film. Fillers may comprise particulate inorganic materials such as, for example, calcium carbonate, various kinds of clay, silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, glass particles, and the like, and organic particulate materials such as high-melting point polymers (e.g., TEFLON® and KEVLAR® from E.I. DuPont de Nemours and Company), pulp powder, wood powder, cellulose derivatives, chitin and chitin derivatives, and the like. Filler particles may optionally be coated with a fatty acid, such as stearic acid or reduced stearic acid, or a larger chain fatty acid, such as behenic acid. Without intending to be bound by theory, coated filler particles may facilitate the free flow of the particles (in bulk) and their ease of dispersion into the polymer matrix, according to certain embodiments of the invention.

The term "non-breathable material", as used herein, may comprise any material that either does not allow water vapor to pass through the material or substantially impedes the movement of water vapor through the material. According to an embodiment of the invention, non-breathable materials may comprise a thermoplastic resin, such as polyethylene, polypropylene, polyester, polyamide, polyethylene vinyl acetate, polyvinyl chloride, or polyvinylidene chloride, or any copolymers or physical blends thereof. In other embodiments of the invention, the thermoplastic resin may comprise or even further comprise, for example, a low density polyethylene (LDPE), linear low density polyethylene (LLDPE), high density polyethylene (HDPE), polypropylene (PP), copolymers or terpolymers of ethylene, or functionalized polymers of ethylene, or any coextrusion or blend thereof.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, hydroentangling, air-laid, and bonded carded web processes.

The term "layer", as used herein, may comprise a generally recognizable combination of similar material types and/or functions existing in the X-Y plane. A film of the invention may include one layer in the embodiments of the invention directed to a single layer film or more than one layer in the embodiments of the invention directed to multilayer film.

As used herein, the term "proximate" in the context of the relative positioning of two particular layers of a multilayer film may comprise the positioning of a layer being one or more layers removed from another layer. For example, the term "proximate" in the context of the relative positioning of a first layer and a second layer may mean that the first and second layers may be separated by 1, 2, 3, or more intermediate layers, such as layers positioned between the core layer and a skin layer. Layers that are positioned proximate to one another are adequately positioned so as to achieve a desired construct and/or functionality.

The term "laminate", as used herein, may be a structure comprising two or more layers, such as a film layer and a fibrous layer. The two layers of a laminate structure may be joined together such that a substantial portion of their common X-Y plane interface, according to certain embodiments of the invention.

The term "spunbond", as used herein, may comprise fibers which are formed by extruding molten thermoplastic material as filaments from a plurality of fine, usually circular, capillaries of a spinneret with the diameter of the extruded filaments then being rapidly reduced, these filaments forming a web by deposition on a moving belt and subsequently bonded. According to an embodiment of the invention, spunbond fibers are generally not tacky when they are deposited onto a collecting surface and may be generally continuous.

The term "substantial" may encompass the whole amount as specified according to certain embodiments of the invention, and largely but not the whole amount specified according to other embodiments of the invention.

The term "meltblown", as used herein, may comprise fibers formed by extruding a molten thermoplastic material through a plurality of fine die capillaries as molten threads or filaments and subjecting those threads or filaments to the effect of a high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers are microfibers which may be continuous or discontinuous and are generally tacky when deposited onto a collecting surface.

The term "sub-micron nonwoven", as used herein, may comprise fibers having diameters of less than about 1000 nanometers (i.e., one micron). Sub-micron fiber webs may be desired, for example, due to their high surface area and low pore size, among other characteristics. Methods of producing sub-micron fibers include melt fibrillation. Melt fibrillation is a general class of fiber production in which one or more polymers are molten and extruded into many possible configurations (e.g. co-extrusion, homogeneous or bicomponent films or filaments) and then fibrillated or fiberized into filaments. Non-limiting examples of melt fibrillation methods comprise melt blowing, melt fiber bursting, melt electroblowing, melt circular spinning and melt film fibrillation. Methods of producing sub-micron fibers not from melts comprise film fibrillation, electro-spinning, and solution spinning. Other methods of producing sub-micron fibers include spinning a larger diameter bi-component fiber in an islands-in-the-sea, segmented pie, or other configuration where the fiber is then further processed so that sub-micron fibers result.

I. Breathable Single Layer Film

In one aspect, the invention provides a breathable single layer film suitable for a wide variety of end-uses. Breathable single layer films, according to certain embodiments of the invention, may include many desirable features for a variety of applications including, for example, protective apparel and industrial applications, such as surgical gowns, aprons, and housewrap to name just a few. In general, breathable single layer films according to certain embodiments of the invention may be constructed of a single monolithic core layer.

In accordance with certain embodiments of the invention, the monolithic core layer comprises at least one breathable polymer. According to certain embodiments, the core-layer highly breathable polymer may be hygroscopic. In some embodiments, for example, the core layer may comprise at least about 50 wt. % to about 100 wt. % of the core-layer highly breathable polymer. In other embodiments, for instance, the core layer may comprise at least about 75 wt. % to about 100 wt. % of the core-layer highly breathable polymer. In further embodiments, for example, the core layer may comprise at least about 80 wt. % to about 100 wt. % of the core-layer highly breathable polymer. As such, in certain embodiments, the monolithic core layer may comprise a core-layer highly breathable polymer comprising from at least about any of the following: 50, 75, 80, and 100 wt. % (e.g., at least about 50 wt. % to about 100 wt. %).

In such embodiments, the core-layer highly breathable polymer may comprise at least one of a thermoplastic urethane (TPU), a polyether block amide copolymer (e.g., PEBAX® from Arkema Group), or a copolyester thermoplastic elastomer (e.g., ARNITEL® from DSM Engineering Plastics, HYTREL® from E.I. DuPont de Nemours and Company). In certain embodiments, for example, the core-layer highly breathable polymer may comprise a copolyester thermoplastic elastomer. In this regard, certain embodiments of the invention may comprise a monolithic core comprising at least one core-layer highly breathable polymer.

In accordance with certain embodiments of the invention, the core layer may also comprise at least one non-breathable polymer. In some embodiments, for instance, the core layer may comprise at most about 0 wt. % to at most about 50 wt. % of the non-breathable polymer. In other embodiments, for example, the core layer may comprise at most about 0 wt. % to at most about 25 wt. % of the non-breathable polymer. In further embodiments, for instance, the core layer may comprise at most about 0 wt. % to at most about 20 wt. % of the non-breathable polymer. As such, in certain embodiments, the monolithic core layer may comprise a core-layer non-breathable polymer comprising from at most about any of the following: 50, 40, 25, 20, 15, 10, 5 and 0 wt. % (e.g., at most about 0 wt. % to about 50 wt. %).

In accordance with certain embodiments of the invention, the breathable single layer film may be monolithic. In certain embodiments, the core layer may be devoid of micropores. As such, the monolithic core layer may be continuous and substantially free or free of pores. The breathable single layer film may act as a barrier to liquids, bacteria, viruses, and particulate matter but allow water vapor to pass through it.

As such, in accordance with certain embodiments of the invention, the single layer film may have a high MVTR. In certain embodiments, for example, the single layer film may have an MVTR of at least 500 g/m²/day. In other embodiments, for instance, the single layer film may have an MVTR of at least 800 g/m²/day. In other embodiments, for instance, the single layer film may have an MVTR of at least 1000 g/m²/day. As such, the single layer film may have an MVTR from at least about any of the following: 500, 800, and 1000 g/m²/day and/or at most about 3000, 2500, and 2000 g/m²/day (e.g., 500-3000 g/m²/day, 1000-3000 g/m²/day). MVTR may be measured with the upright cup method per ASTM E96D using water, a temperature of 32° C. and an ambient humidity of 50%.

In accordance with certain embodiments of the invention, the single layer film may have a low coefficient of friction. In certain embodiments, for example, the single layer film may have a coefficient of friction less than 2. In other embodiments, for instance, the single layer film may have a coefficient of friction less than 1. In some embodiments, for example, the breathable single layer film may have a coefficient of friction less than 5, while in other embodiments the breathable single layer film may have a coefficient of friction less than 4, in further embodiments the breathable single layer or film may have a coefficient of friction less than 3, in other embodiments the breathable single layer film may have a coefficient of friction less than 2, and in further embodiments the breathable single layer film may have a coefficient of friction less than 1. Coefficient of friction may be measured as per ASTM test method D1894-08.

In accordance with certain embodiments of the invention, the single layer film may have a low basis weight. In certain embodiments, for instance, the single layer film may have a basis weight comprising from about 5 to about 20 gsm. In other embodiments, for example, the single layer film may have a basis weight comprising from about 10 to about 15 gsm. In further embodiments, for instance, the single layer film may have a basis weight comprising from about 11 to about 13 gsm. As such, the breathable single layer film may comprise a basis weight from at least about any of the following: 5, 10, and 11 gsm and/or at most about 20, 15, and 13 gsm (e.g., 11-13 gsm, 10-15 gsm, etc.). Basis weight may be measured in a way that is consistent with the ASTM test method. D3776. For example, results may be obtained in units of mass per unit area in g/m² (gsm) by weighing a minimum of ten 10 cm by 10 cm pieces for each sample. Low basis weight may be associated with good drapability and breathability. In this regard, the breathable single layer film may exhibit good drapability and breathability.

According to certain embodiments of the invention, the single layer film may comprise one or more additives. In an embodiment of the invention, the single layer film comprises a color additive. In certain other embodiments of the invention, the single layer film comprises a releasing agent.

In an embodiment of the invention, the breathable single layer film comprises at least one breath polymer and at least one non-breathable polymer. In certain embodiments of the invention, the single layer film comprises from about 50% to about 99%, from about 60% to about 98%, from about 70% to about 97%, from about 80% to about 96%, or from about 90% to about 95%, all by weight, of at least one breathable polymer. In certain embodiments of the invention, the single layer film comprises from about 0.5% to about 50%, from about 1% to about 20%, from about 2% to about 10%, or from about 3% to about 95%, all by weight, of at least one non-breathable polymer.

In certain embodiments of the invention, the breathable single layer film comprise from about 0.1% to about 5%, from about 0.2% to about 4%, from about 0.3% to about 3%, from about 0.4% to about 2.5%, or from about 0.5% to about 2%, all based upon weight, of a releasing agent. In certain embodiments of the invention, the breathable single layer film comprises from about 0.1% to about 5%, from about 0.5% to about 3%, or from about 1% to about 2%, all by weight, of a color masterbatch.

II. Breathable Multilayer Film

In one aspect, the invention provides breathable multilayer films suitable for a wide variety of end-uses. Breathable multilayer films, according to certain embodiments of the invention, may include many desirable features for a variety of applications including, for example, protective apparel and industrial applications, such as surgical gowns, aprons, and housewrap to name just a few. In general, breathable multilayer films according to certain embodiments of the invention may be constructed of a monolithic core layer and at least one skin layer that are co-extruded.

In accordance with certain embodiments of the invention, the monolithic core layer comprises at least one core-layer highly breathable polymer. According to certain embodiments, the core-layer highly breathable polymer may be hygroscopic. In some embodiments, for example, the core layer may comprise at least about 50 wt. % to about 100 wt. % of the core-layer highly breathable polymer. In other embodiments, for instance, the core layer may comprise at least about 75 wt. % to about 100 wt. % of the core-layer highly breathable polymer. In further embodiments, for example, the core layer may comprise at least about 80 wt. % to about 100 wt. % of the core-layer highly breathable polymer. As such, in certain embodiments, the monolithic core layer may comprise a core-layer highly breathable polymer comprising from at least about any of the following: 50, 75, 80, and 100 wt. % (e.g., at least about 50 wt. % to about 100 wt. %).

In such embodiments, the core-layer highly breathable polymer may comprise at least one of a thermoplastic urethane (TPU), a polyether block amide copolymer (e.g., PEBAX® from Arkema Group), or a copolyester thermoplastic elastomer (e.g., ARNITEL® from DSM Engineering Plastics, HYTREL® from E.I. DuPont de Nemours and Company). In certain embodiments, for example, the core-layer highly breathable polymer may comprise a copolyester thermoplastic elastomer. In this regard, certain embodiments of the invention may comprise a monolithic core comprising at least one core-layer highly breathable polymer.

In accordance with certain embodiments of the invention, the core layer may also comprise at least one non-breathable polymer. In some embodiments, for instance, the core layer may comprise at most about 0 wt. % to at most about 50 wt. % of the non-breathable polymer. In other embodiments, for example, the core layer may comprise at most about 0 wt. % to at most about 25 wt. % of the non-breathable polymer. In further embodiments, for instance, the core layer may comprise at most about 0 wt. % to at most about 20 wt. % of the non-breathable polymer. As such, in certain embodiments, the monolithic core layer may comprise a core-layer non-breathable polymer comprising from at most about any of the following: 50, 40, 25, 20, 15, 10, 5 and 0 wt. % (e.g., at most about 0 wt. % to about 50 wt. %).

In accordance with certain embodiments of the invention, the breathable multilayer film may also comprise a first skin layer comprising at least one first-skin-layer highly breathable polymer, a first-skin-layer filler, and a first-skin-layer non-breathable material. In certain embodiments, the breathable multilayer film further comprises a second skin layer comprising at least one second-skin-layer highly breathable polymer, a second-skin-layer filler, and a second-skin-layer non-breathable material.

According to certain embodiments of the invention, the first-skin-layer highly breathable polymer, the second-skin-layer highly breathable polymer, or both may be hygroscopic. However, in certain embodiments, the first skin layer, the second skin layer, or both may be less hygroscopic than the core layer. Additionally, in some embodiments, the first skin layer, the second skin layer, or both may be less tacky than the core layer.

In accordance with certain embodiments of the invention, for example, the first skin layer may comprise about 30 wt. % to about 98 wt. % of the first-skin-layer highly breathable polymer. In other embodiments, for instance, the first skin layer may comprise about 50 wt. % to about 98 wt. % of the first-skin-layer highly breathable polymer. In further embodiments, for example, the first skin layer may comprise about 90 wt. % to about 98 wt. % of the first-skin-layer highly breathable polymer. As such, the first skin layer may comprise a first-skin-layer highly breathable polymer weight percent from at least about any of the following: 30, 50, and 90 wt. % and/or at most about 98, 95, and 90 wt. % (e.g., about 50-98 wt. %, about 30-90 wt. %, etc.). Furthermore, according to certain embodiments of the invention, for instance, the second skin layer may comprise about 30 wt. % to about 98 wt. % of the second-skin-layer highly breathable polymer. In other embodiments, for example, the second skin layer may comprise about 50 wt. % to about 98 wt. % of the second-skin-layer highly breathable polymer. In further embodiments, for instance, the second skin layer may comprise about 90 wt. % to about 98 wt. % of the second-skin-layer highly breathable polymer. As such, the second skin layer may comprise a second-skin-layer highly breathable polymer weight percent from at least about any of the following: 30, 50, and 90 wt. % and/or at most about 98, 95, and 90 wt. % (e.g., about 50-98 wt. %, about 30-90 wt. %, etc.

In such embodiments, the first-skin-layer highly breathable polymer, the second-skin-layer highly breathable polymer, or both may comprise at least one of a thermoplastic urethane (TPU), a polyether block amide copolymer (e.g., PEBAX® from Arkema Group), or a copolyester thermoplastic elastomer (e.g., ARNITEL® from DSM Engineering Plastics, HYTREL® from EL DuPont de Nemours and Company). In certain embodiments, for example, the first-skin-layer highly breathable polymer, the second-skin-layer highly breathable polymer, or both may comprise a copolyester thermoplastic elastomer. In this regard, the skin layer(s) may comprise the same or different highly breathable polymer from the core layer. Moreover, the first-skin-layer highly breathable polymer may be the same as or different from the second-skin-layer highly breathable polymer and the core-layer highly breathable polymer.

In accordance with certain embodiments of the invention, the first skin layer may further comprise a first-skin-layer filler, Additionally, in other embodiments, the second skin layer may further comprise a second-skin-layer filler. In certain embodiments, the first-skin-layer filler, second-skin-layer filler, or both comprise particles or aggregates of particles. The filler, for example, may comprise particles or aggregates of particles, which will not chemically interfere with or adversely affect the extruded film. In such embodiments, the first-skin-layer filler, the second-skin-layer filler, or both may comprise organic particles or inorganic particles. In some embodiments, the first-skin-layer filler, second-skin-layer filler, or both may comprise a polymer material having a melting point that exceeds the melting points of the core-layer highly breathable polymer, the first-skin-layer highly breathable polymer, and the second-skin-layer highly breathable polymer. In other embodiments, the first-skin-layer filler, second-skin-layer filler, or both may comprise calcium carbonate, clay, talc, or any combination thereof. In accordance with certain embodiments of the invention, for example, the first-skin-layer filler, second-skin-layer filler, or both may be formed from particulate inorganic materials such as, for example, calcium carbonate, various kinds of clay, silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, glass particles, and the like, and organic particulate materials such as high-melting point polymers (e.g., TEFLON® and KEVLAR® from E.I. DuPont de Nemours and Company), pulp powder, wood powder, cellulose derivatives, chitin and chitin derivatives, and the like, or combinations thereof. In such embodiments, for instance, the first-skin-layer filler, the second-skin-layer filler, or both may be calcium carbonate.

In certain embodiments, for example, the first skin layer may comprise about 2 wt. % to about 40 wt. % of the first-skin-layer filler. In other embodiments, for instance, the first skin layer may comprise about 3 wt. % to about 12 wt. % of the first-skin-layer filler. As such, the first skin layer may comprise a first-skin-layer filler (e.g., calcium carbonate) weight percent from at least about any of the following: 1, 3, 5, 7, 10, 12, 14, 20, 25, and 35 wt. % and/or at most about 40, 30, 20, 16, 14, and 8 wt. % (e.g., about 7-8 wt. 3-16 wt. %, etc.). According to certain embodiments, for example, the second skin layer may comprise about 2 wt. % to about 40 wt. % of the second-skin-layer filler. In other embodiments, for instance, the second skin layer may comprise about 3 wt. % to about 12 wt. % of the second-skin-layer filler. As such, the second skin layer may comprise a second-skin-layer filler (e.g., calcium carbonate) weight percent from at least about any of the following: 1, 3, 5, 7, 10, 12, 14, 20, 25, and 35 wt, % and/or at most about 40, 30, 20, 16, 14, and 8 wt. % (e.g., about 7-8 wt. 14-16 wt. %, etc.).

In certain embodiments, the first-skin-layer filler may be substantially dispersed in the first skin layer, and the second-skin-layer filler may be substantially dispersed in the second skin layer. In certain embodiments, for example, the filler may be uniformly dispersed throughout the melt and/or the resulting film. According to certain embodiments, the first skin layer has a first-skin-layer thickness, and the first-skin-layer filler may comprise a median particle diameter greater than the first-skin-layer thickness. Thickness of the film may be measured as per ASTM test method D5729 and the thickness of the layers can be calculated from the above measurement and mass balance calculations. In further embodiments, the first-skin-layer filler may define a plurality of protrusions on an outer surface of the first skin layer. Additionally, in certain embodiments, the second skin layer has a second-skin-layer thickness, and the second-skin-layer filler may comprise a median particle diameter greater than the second-skin-layer thickness. In further embodiments, the second-skin-layer filler may define a plurality of protrusions on an outer surface of the second skin layer.

The thickness for each of the layers the core layer, the first skin layer, and the second skin layer) may be determined, for example, based on the measured film thickness (e.g., the multilayer film's overall thickness as measured per ASTM test method D5729), the relative extruder throughput (kg/hr) for the core layer and each of the skin layer(s), and the respective densities for the core layer composition (e.g., core-layer polymer melt which forms the core layer) at room temperature and the skin layer composition (e.g., skin-layer polymer melt which forms the skin layer(s)) at room temperature. For instance, the extruder throughput (kg/hr) for each of the core layer and the skin layer(s) may be monitored and recorded during production such that a known mass of each respective composition (e.g., core layer composition and skin layer(s) composition) may be known. Similarly, the density ($kg/m^3$) for the core layer composition and the skin layers) composition at room temperature may be commercially available or readily measured such that the density of the final layers (e.g., core layer, first skin layer, and second skin layer) may also be known. Given the respective densities and respective extruder throughput, the relative volume for the core layer and the skin layer(s) may be calculated by dividing the respective mass throughput by the respective density. For example, the mass throughput for the core layer may be divided by the density of the core layer composition to provide a relative volume for the core layer. Similarly, the mass throughput for the skin layer(s) may be divided by the density of the skin layer composition to provide a relative volume for the skin layer(s). For a given area ($m^2$) of the multilayer film, the core layer and skin layer(s) may comprise a substantially similar area in the X-Y plane (e.g., the individual layers substantially or completely overlap with one another in the X-Y plane). Given the substantially similar dimensions in the X-Y plane for each layer, the relative volumes for the core layer and the skin layer(s) may define a core-to-skin ratio that may be used in conjunction with the multilayer film's overall thickness as measured per ASTM test method D5729. For example, the core-to-skin ratio may be used to estimate the relative thickness of the core layer and the skin layer(s). In embodiments comprising two skin layers, for example, the first and second skin layers may, for example, be assumed to be substantially the same thickness. Assuming, for example, that the core-to-skin ratio comprises 5:5, then the core layer of the multilayer film would be estimated to comprise 50% of the overall thickness of the multilayer film, while the first skin layer and the second skin layer would each be estimated to be 25% of the overall thickness of the multilayer film. By way of further example only, if the multilayer film comprises a core layer and two skin layers (assumed to comprise substantially the same thickness) and the multilayer film's overall thickness is measured (as discussed above) to be 20 microns, while the core-to-skin ratio obtained via calculation of the relative volumes is 60:40, then the core layer would be estimated as comprising about 12 microns and the aggregate of the skin layers would be estimated as comprising about 8 microns. If estimating that the first and second skin layers comprise substantially the same thickness, then the first and second skin layers would be estimated to each comprise about 4 microns.

In accordance with certain embodiments of the invention, the first skin layer may further comprise a first-skin-layer non-breathable material. Additionally, in other embodiments, the second skin layer may further comprise a second-skin-layer non-breathable material. In certain embodiments, for example, the first-skin-layer non-breathable material, the second-skin-layer non-breathable material, or both may comprise a polyolefin polymer. In such embodiments, for instance, the first-skin-layer non-breathable material, the second-skin-layer non-breathable material, or both may comprise a polyethylene polymer. In further embodiments, for example, the first-skin-layer non-breathable material, the second-skin-layer non-breathable material, or both may comprise a low density polyethylene, a linear low density polyethylene, a high density polyethylene, a copolymer or terpolymer of ethylene, a functionalized polymer of ethylene, or any combination thereof. According to certain embodiments, for example, the non-breathable film may comprise a thermoplastic resin, such as polyethylene, polypropylene, polyester, polyimide, polyethylene vinyl acetate, polyvinyl chloride, or polyvinylidene chloride, or any copolymers or physical blends thereof. The thermoplastic resin further can be, for example, a low density polyethylene (LDPE), linear low density polyethylene (LLDPE), high density polyethylene (HDPE), polypropylene (PP), copolymers or terpolymers of ethylene, or functionalized polymers of ethylene, or any coextrusion or blend thereof.

In certain embodiments, for instance, the first skin layer may comprise about 0.5 wt. % to about 15 wt. % of the first-skin-layer non-breathable material. In other embodiments, for example, the first skin layer may comprise about 0.5 wt. % to about 6 wt. % of the first-skin-layer non-breathable material. In further embodiments, for instance, the first skin layer may comprise about 0.5 wt. % to about 3 wt. % of the first-skin-layer non-breathable material. As such, the first skin layer may comprise a first-skin-layer non-breathable material (e.g., polyethylene-based polymer) weight percent from at least about any of the following: 0.5, 1, 2, 4, 8, and 10 wt. % and/or at most about 15, 10, 8, 6, and 3 wt. % (e.g., about 2-3 wt. %, about 4-6 wt. etc.). According to certain embodiments, for example, the second skin layer may comprise about 0.5 wt. % to about 15 wt. % of the second-skin-layer non-breathable material. In other embodiments, for instance, the second skin layer may comprise about 0.5 wt. % to about 6 wt. % of the second-skin-layer non-breathable material. In further embodiments, for example, the second skin layer may comprise about 0.5 wt. % to about 3 wt. % of the second-skin-layer non-breathable material. As such, the second skin layer may comprise a second-skin-layer non-breathable material (e.g., polyethylene-based polymer) weight percent from at least about any of the following: 0.5, 1, 2, 4, 8, and 10 wt. % and/or at most about 15, 10, 8, 6, and 3 wt. % (e.g., about 2-3 wt. %, about 4-6 wt. %, etc.).

In accordance with certain embodiments of the invention, for instance, the multilayer film may comprise no more than 20% by weight of the first skin layer, the second skin layer, or an aggregate of the first skin layer and the second skin layer. In other embodiments, for example, the multilayer film may comprise no more than 15% by weight of the first skin layer, the second skin layer, or an aggregate of the first skin layer and the second skin layer. In further embodiments, for instance, the multilayer film may comprise no more than 0% by weight of the first skin layer, the second skin layer, or an aggregate of the first skin layer and the second skin layer. As such, the breathable multilayer film may comprise a first and/or second skin layer weight percent from at most about any of the following: 20, 15, and 10 wt. % (e.g., no more than 10 wt. %, no more than 15 wt. %, etc.).

In accordance with certain embodiments of the invention, the core layer has a core-layer thickness, the first skin layer has a first-skin-layer thickness, and the second skin layer has a second-skin-layer thickness. In such embodiments, the core-layer thickness may be greater than each of the first-skin-layer thickness and the second-skin-layer thickness. Furthermore, the core-layer thickness may be greater than an aggregate of the first-skin-layer thickness and the second-skin-layer thickness. In this regard, the first skin layer, the second skin layer, or an aggregate of the first and second skin layers may be thinner than the core layer.

In certain embodiments, the core layer has a top surface and a bottom surface, and the first skin layer may be positioned above and at least one of proximate or adjacent to at least a portion of the top surface of the core layer. In such embodiments, for example, the first skin layer may be directly adjacent to the top surface of the core layer. Furthermore, according to certain embodiments, the second skin layer may be positioned below and at least one of proximate or adjacent to at least a portion of the bottom surface of the core layer. In such embodiments, for instance, the second skin layer may be directly adjacent to the bottom surface of the core layer.

In accordance with certain embodiments of the invention, the breathable multilayer film may be monolithic. In certain embodiments, the core layer may be devoid of micropores. As such, the monolithic core layer may be continuous and substantially free or free of pores. In other embodiments, the core layer and the first skin layer may be devoid of micropores. In further embodiments, the core layer and the second skin layer may be devoid of micropores. As such, the core layer and one of the skin layers may be monolithic and, therefore, continuous and substantially free or free of pores. According to certain embodiments, the entirety of the breathable multilayer film may be monolithic. In this regard, the breathable multilayer film may act as a barrier to liquids, bacteria, viruses, and particulate matter but allow water vapor to pass through it, As such, in accordance with certain embodiments of the invention, the multilayer film may have a high MVTR. In certain embodiments, for example, the multilayer film may have an MVTR of at least 500 g/m²/day. In other embodiments, for instance, the multilayer film may have an MVTR of at least 1000 g/m²/day. As such, the multilayer film may have an MVTR from at least about any of the following: 500, 750, and 1000 g/m²/day and/or at most about 3000, 2500, and 2000 g/m²/day (e.g., 500-3000 g/m²/day, 1000-3000 g/m²/day). The multilayer film may have an MVTR of at least about 800 g/m²/day, according to certain embodiments of the invention. MVTR may be measured with the upright cup method per ASTM E96D using water, a temperature of 32° C. and an ambient humidity of 50%.

In accordance with certain embodiments of the invention, the multilayer film may have a low coefficient of friction. In certain embodiments, for example, the multilayer film may have a coefficient of friction less than 2. In other embodiments, for instance, the multilayer film may have a coefficient of friction less than 1. In some embodiments, for example, the breathable multilayer film may have a coefficient of friction less than 5, while in other embodiments the breathable multilayer film may have a coefficient of friction less than 4, in further embodiments the breathable multilayer film may have a coefficient of friction less than 3, in other embodiments the breathable multilayer film may have a coefficient of friction less than 2, and in further embodiments the breathable multilayer film may have a coefficient of friction less than 1. Coefficient of friction may be measured as per ASTM test method D1894-08.

In accordance with certain embodiments of the invention, the multilayer film may have a low basis weight. In certain embodiments, for instance, the multilayer film may have a basis weight comprising from about 5 to about 20 gsm. In other embodiments, for example, the multilayer film may have a basis weight comprising from about 10 to about 15 gsm. In further embodiments, for instance, the multilayer film may have a basis weight comprising from about 11 to about 13 gsm. As such, the breathable multilayer film may comprise a basis weight from at least about any of the following: 5, 10, and 11 gsm and/or at most about 20, 15, and 13 gsm (e.g., 11-13 gsm, 10-15 gsm, etc.). Basis weight may be measured in a way that is consistent with the ASTM test method D3776, For example, results may be obtained in units of mass per unit area in g/m² (gsm) by weighing a minimum of ten 10 cm by 10 cm pieces for each sample. Low basis weight may be associated with good drapability and breathability. In this regard, the breathable multilayer film may exhibit good drapability and breathability.

According to certain embodiments of the invention, for example, the breathable multilayer film may comprise a monolithic core layer, first skin layer, and second skin layer. In such embodiments, the monolithic core layer has a top surface and a bottom surface and may comprise about 50-100 wt. % of one or more hygroscopic highly breathable polymers. Furthermore, according to such embodiments, the first skin layer is positioned above and directly adjacent to the top surface of the core layer and may comprise about 80-98 wt. % of one or more highly breathable polymers, about 1-40 wt, % of a filler, and about 0.2-10 wt. % of at least one non-breathable material. The filler, according to such embodiments, may comprise particles or aggregates of particles that may form bumps on the outside surface of the composite. This can be observed by using scanning electron microscopy. In a further embodiment, the particles or aggregates of particles may have a greater median filler particle diameter than the first skin layer thickness, and defines a plurality of protrusions on the first skin layer. Furthermore, according to such embodiments, the second skin layer is positioned below and directly adjacent to the bottom surface of the core layer and may comprise about 80-98 wt. % of one or more highly breathable polymers, about 1-40 wt. % of a filler, and about 02-10 wt. % of at least one non-breathable material. The filler, according to such embodiments, may comprise particles or aggregates of particles that may form bumps on the outside surface of the composite. This can be observed by using scanning electron microscopy. In a further embodiment, for example, the particles or aggregates of particles may have a greater median filler particle diameter than the second skin layer thickness, and defines a plurality of protrusions on the second skin layer.

For example, FIG. 1 illustrates a cross sectional view of a breathable multilayer film according to an embodiment of the invention. As shown in FIG. 1, the breathable multilayer film 1 illustrated in FIG. 1 includes a monolithic core layer 102, a first skin layer 104 directly adjacent to the top surface of the monolithic core layer 102, and a second skin layer 108 directly adjacent to the bottom surface of the monolithic core layer 102. Filler particles 106a, 106b are dispersed in the first skin layer 104 and second skin layer 108. Some of the filler particles 106a, 106b form protrusions 112 on the outer surface 110a of the first skin layer 104 and the outer surface 110b of the second skin layer 108.

Figure 2A:
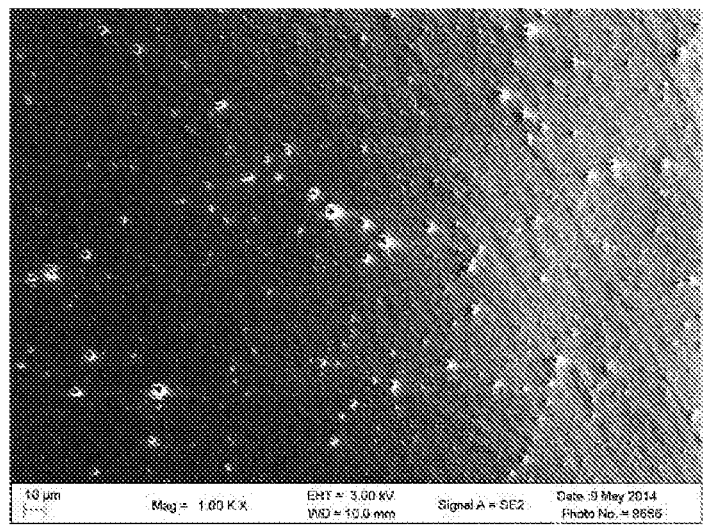
FIG. 2A illustrates a SEM micrograph at 1000× of an outer surface of a breathable multilayer film with a filler comprising calcium carbonate in the skin layer according to an embodiment of the invention.
Figure 2B:
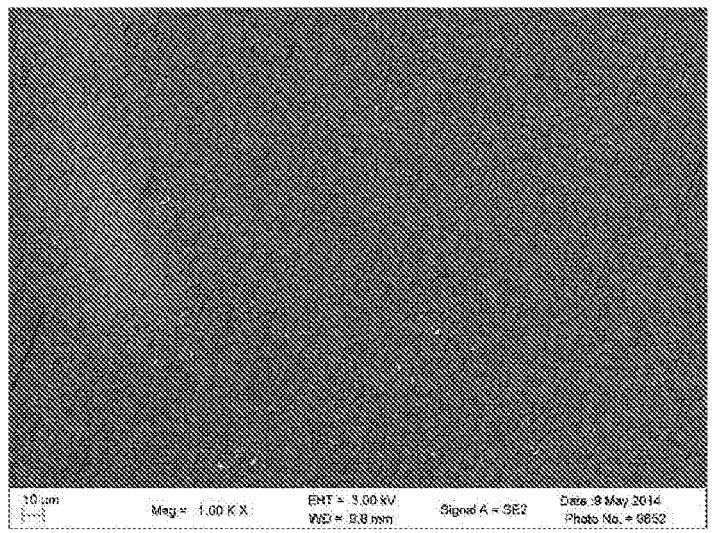
FIG. 2B illustrates a SEM micrograph at 1000× of an outer surface of a breathable multilayer film substantially free of any filler in the skin layer according to an embodiment of the invention.

FIGS. 2A and 2B, for example, illustrate the differences between skin layers with and without a filler comprising calcium carbonate, FIG. 2A is a SEM micrograph at 1000× of an outer surface of a breathable multilayer film with a filler comprising calcium carbonate in the skin layer that has a core layer comprising a copolyester thermoplastic elastomer and skin layers comprising a copolyester thermoplastic elastomer and a calcium carbonate masterbatch, which comprises 80% by weight of calcium carbonate and 20% by weight of polyethylene, according to an embodiment of the invention. In contrast, FIG. 2B is a SEM micrograph at 1000× of an outer surface of a breathable multilayer film substantially free of any filler in the skin layer that has a copolyester thermoplastic elastomer core layer and skin layers comprising a copolyester thermoplastic elastomer and polyethylene, according to an embodiment of the invention. Thus, the breathable multilayer film illustrated in FIG. 2B does not include a filler. FIGS. 2A and 2B illustrate that the addition of filler comprising calcium carbonate according to certain embodiments of the invention in the skin layer(s) produces a plurality of protrusions on the surface of the skin layer as shown in FIG. 2A, whereas breathable multilayer films substantially free of a filler comprising calcium carbonate do not exhibit protrusions on the surface of the skin layer as shown in FIG. 2B. Due to these protrusions, breathable multilayer films having a filler, in particular a filler comprising calcium carbonate, in the skin layers may achieve a lower coefficient of friction than breathable multilayer films substantially free of a filler in the skin layers.

III. Laminate

In another aspect, the invention provides a laminate. In certain embodiments, the laminate may comprise the breathable multilayer film referenced above and at least one fibrous layer. According to certain embodiments, the fibrous layer may comprise a woven material. Alternatively, in other embodiments, the fibrous layer may comprise a nonwoven material. In such embodiments, the nonwoven material may comprise at least one nonwoven web. In such embodiments, for example, the nonwoven material may comprise a spunbond layer. Alternatively or in addition, for example, the nonwoven material may comprise a meltblown layer. Alternatively or in addition, for example, the nonwoven material may comprise a sub-micron nonwoven layer. In accordance with certain embodiments, the nonwoven material may comprise a composite comprising any combination of meltblown, spunbond, and sub-micron layers. In such embodiments, the composite may also optionally include a film layer, such as a breathable film layer.

In accordance with certain embodiments of the invention, the laminate may be formed by attaching the breathable multilayer film to the fibrous layer. In certain embodiments, for instance, the breathable multilayer film and the fibrous layer may be laminated via a discontinuous or continuous coating of adhesive. In such embodiments, the discontinuous coating, for example, of adhesive may comprise fiberized or nebulized or printed hotmelt adhesive.

In accordance with certain embodiments of the invention, the laminate may be suitable for a wide variety of commercial applications. In certain embodiments, for example, the laminate may comprise an item of protective apparel or a portion thereof. In such embodiments, the item of protective apparel or portion thereof may comprise a surgical gown, a surgical drape, or a protective apron. In other embodiments, for example, the laminate may comprise an item of industrial use or a portion thereof. In such embodiments, the item of industrial use or portion thereof may comprise a roofing material or housewrap.

Figure 3:
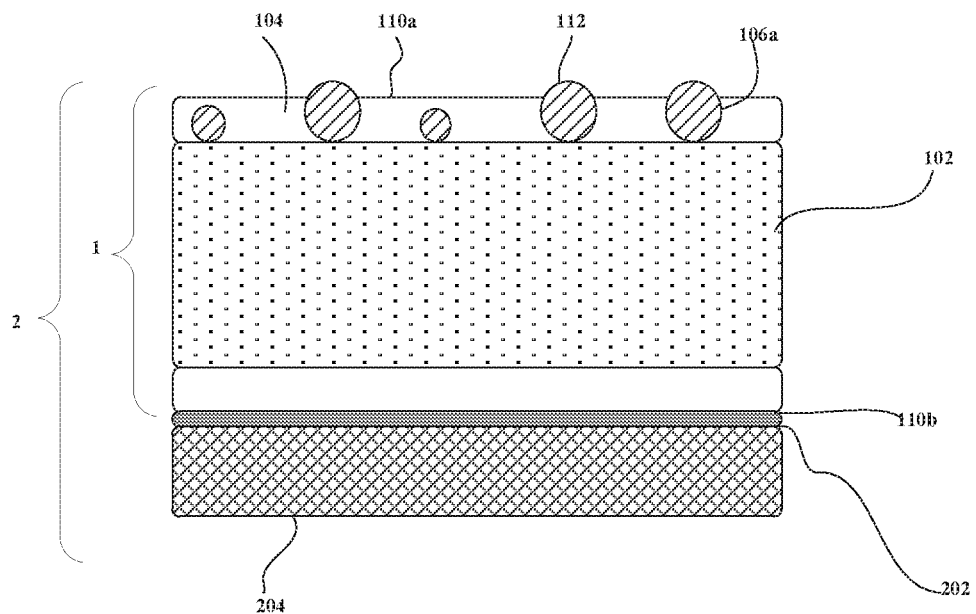
FIG. 3 illustrates a cross sectional view of a laminate according to an embodiment of the invention.

For example, FIG. 3 illustrates a cross sectional view of a laminate according to an embodiment of the invention. As shown in FIG. 3, the laminate 2 includes a breathable multilayer film 1, an adhesive coating 202 (e.g., a discontinuous or continuous adhesive coating), and a nonwoven layer 204. As illustrated in FIGS. 1 and 3, the breathable multilayer film 1 includes a monolithic core layer 102, a first skin layer 104 directly adjacent to the top surface of the monolithic core layer 102, and a second skin layer 108 directly adjacent to the bottom surface of the monolithic core layer 102. Filler particles 106a are dispersed in the first skin layer 104 but not in the second skin layer 108. Some of the filler particles 106a form protrusions 112 on the outer surface 110a of the first skin layer 104 but not on the outer surface 110b of the second skin layer 108. The adhesive coating 202 (e.g., a discontinuous or continuous adhesive coating) binds the breathable multilayer film 1 to the nonwoven layer 204. The adhesive coating 202 (e.g., a discontinuous or continuous adhesive coating) is directly adjacent to the bottom surface of the second skin layer 108 and directly adjacent to the top surface of the nonwoven layer 204. Together, all of the above features form the laminate 2.

Figure 4:
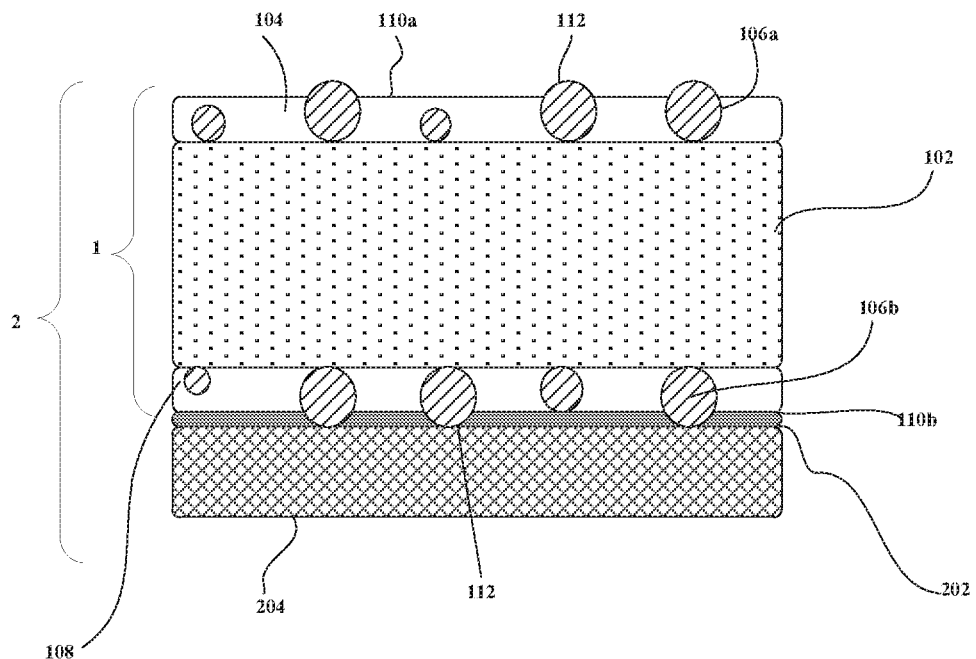
FIG. 4 illustrates a cross sectional view of a laminate according to another embodiment of the invention.

FIG. 4, for example, also illustrates a cross sectional view of a laminate according to another embodiment of the invention. As shown in FIG. 4, the laminate 2 includes a breathable multilayer film 1, an adhesive coating 202, and a nonwoven layer 204. As illustrated in FIGS. 1, 3, and 4, the breathable multilayer film 1 includes a monolithic core layer 102, a first skin layer 104 directly adjacent to the top surface of the monolithic core layer 102, and a second skin layer 108 directly adjacent to the bottom surface of the monolithic core layer 102. Filler particles 106a, 106b are dispersed in the first skin layer 104 and the second skin layer 108. Some of the filler particles 106a, 106b form protrusions 112 on the outer surface 110a of the first skin layer 104 and on the outer surface 110b of the second skin layer 108. The adhesive coating 202 binds the breathable multilayer film 1 to the nonwoven layer 204. The adhesive coating 202 is directly adjacent to the bottom surface of the second skin layer 108 and directly adjacent to the top surface of the nonwoven layer 204.

IV. Process for Forming a Breathable Multilayer Film

In another aspect, the invention provides a process for forming a breathable multilayer film. In some embodiments, the process may comprise co-extruding a multilayer film according to certain embodiments of the invention. According to certain embodiments, for example, the process may further comprise forming a core-layer polymer melt, forming a first-skin-layer polymer melt, co-extruding the core-layer polymer melt and the first-skin-layer polymer melt to form a monolithic core layer and a first skin layer, combining the co-extruded monolithic core layer and first skin layer to form a multilayer film, and laminating the multilayer film to a fibrous layer. In certain embodiments, the process may further comprise forming a second-skin-layer polymer melt, co-extruding the core-layer polymer melt, the first-skin-layer polymer melt, and the second-skin-layer polymer melt to form a monolithic core layer, a first skin layer, and a second skin layer, combining the co-extruded monolithic core layer, first skin layer, and second skin layer to form a multilayer film, and laminating the multilayer film to a fibrous layer.

Figure 5:
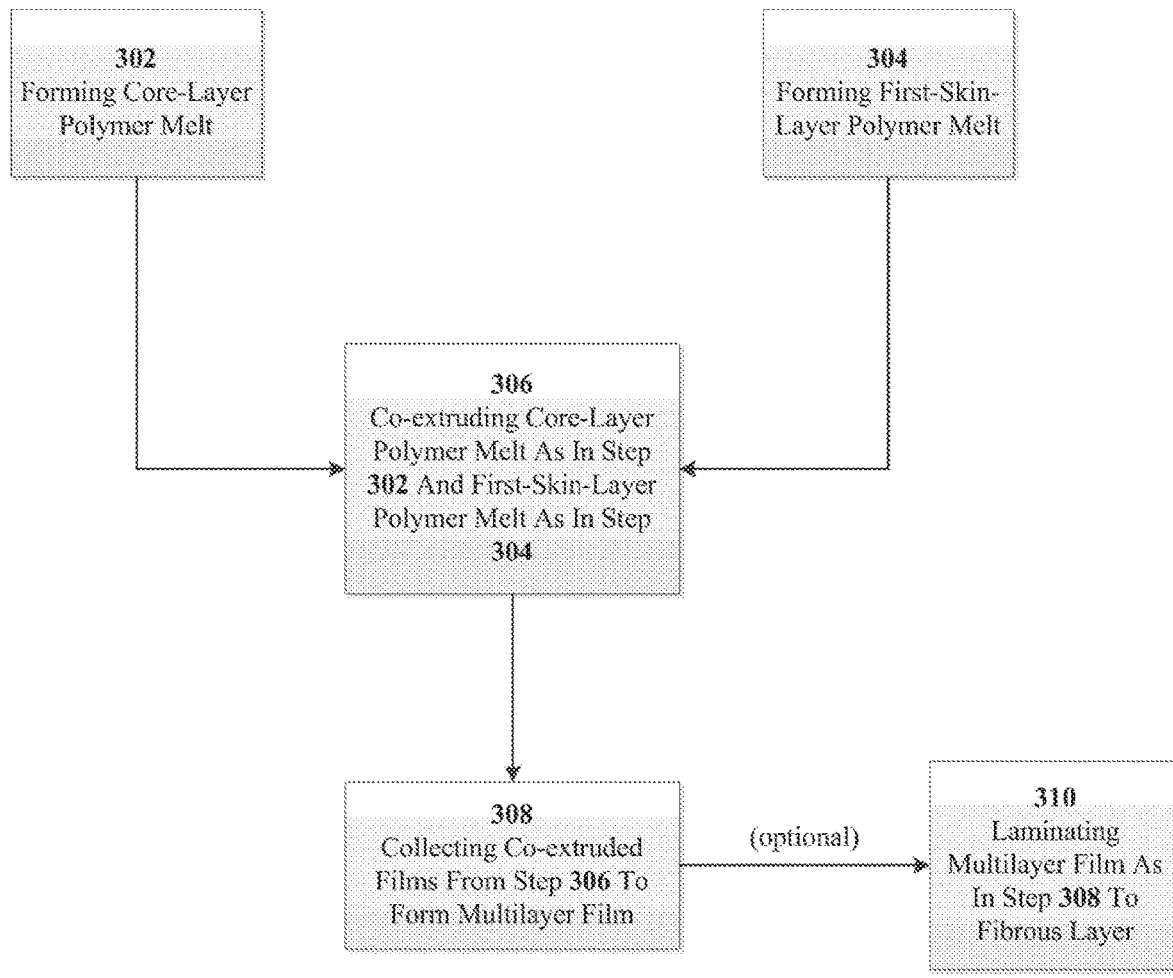
FIG. 5 illustrates a process flow diagram for forming a breathable multilayer film according to an embodiment of the invention showing an optional step of laminating the breathable multilayer film to at least one fibrous layer to form a laminate.

FIG. 5, for example, illustrates a process for forming a breathable multilayer film showing an optional step of laminating the breathable multilayer film to at least one fibrous layer to form a laminate according to an embodiment of the invention. As shown in FIG. 5, the process comprises forming a core-layer polymer melt in step 302 and forming a first-skin-layer polymer melt in step 304. The process further comprises step 306, which comprises co-extruding the core-layer polymer melt formed in step 302 and the first-skin-layer polymer melt formed in step 304. The process further comprises combining the co-extruded films from step 306 to form a multilayer film in step 308. The process may further comprise an optional step 310 where the multilayer film formed in step 308 may be laminated to a fibrous layer to form a laminate.

Thus, the invention includes a highly breathable monolithic film that also exhibits a low tendency to block when wound into a roll and a low coefficient of friction according to certain embodiments of the invention. The invention also includes a laminate using the highly breathable monolithic film and a process for forming the highly breathable monolithic film according to certain embodiments of the invention.

EXAMPLES

The present disclosure is further illustrated by the following examples, which in no way should be construed as being limiting. That is, the specific features described in the following examples are merely illustrative and not limiting.

Test Methods

Basis weight of the following examples was measured in a way that is consistent with the ASTM test method D3776. The results were provided in units of mass per unit area in g/m² (gsm) and were obtained by weighing a minimum of ten 10 cm by 10 cm pieces for each of the samples.

The strip tensile strength of the web is measured according to ASTM test method D5035.

Thickness was measured as per ASTM test method D5729, The thickness for each of the layers is calculated based on the basis weight for that layer calculated from the extruder throughputs for each layer, the estimated density of the component of that layer and the overall film thickness. The die block was assumed to produce the two skin layer at about the same thickness.

Hydrohead was measured as per the INDA standard IST 80.6. During the tests, a Typar (Unipro 130/FX, 44 gsm) was used as a backing material to reinforce the film. If the film has not failed by the time the test reaches 200 mbar, the test is stopped, and the results are reported as >200 mbar.

Pinhole tests for film laminates are normally performed by applying sufficient amounts of methylene blue isopropynol solution (1 gram of methylene blue powder dissolved in one liter of 50% isopropynol) onto a 2 square meter surface of the laminate. After 5 min, the other side of the laminate is inspected for signs of the colored solution having penetrated the film. This process can be repeated as desired (e.g. up to testing 10 square meters). Results are either reported as pinhole per 2 square meters or pinholes per 10 square meters.

MVTR was measured with the uptight cup method per ASTM E96D using water, a temperature of 32° C. and an ambient humidity of 50%.

Coefficient of friction was measured as per ASTM test method D1894-08.

Breathable Multilayer Film Formation

All of the samples were made on a film casting system that included two extruders capable of feeding different formulations to a multilayer extrusion die. For all of the experiments, the die block was used in an ABA film configuration where the co-extruded film consisted of two outer skins made from one formulation, and the core of the film was made from a different formulation. The film was cast on a chill roll with matte finish and subsequently wound into a roll.

Example 1

In Example 1, a film extrusion system capable of producing an ABA co-extruded film was used where a molten film was cast on top of a polypropylene spunbond while it traveled in contact with the chill roll. The film after cooling was subsequently peeled from the carrier web before measurement. For all of the samples from this experiment the die gap was 0.4 mm, For the A to G samples the core layer represented about 85% by weight of the film and was made from 100 Arnitel® VT3108, For samples A to G the two skin layers were assumed to be about the same thickness, and their added weight represented about 15% by weight of the film. For samples A and B the skin layers were made from Arnitel® M400. Both Arnitel® resins are available from DSM Engineering Plastics, P.O. Box 43, 6130 AA Sittard. The Netherlands. For sample C the skin composition was a 14 to 1 blend of Arnitel® M400 and a masterbatch SCC-77941 sold by Standridge Color Corporation, 1196 Hightower Trail, Social Circle, GA, 30025 USA. That masterbatch comprised 75% of calcium carbonate dispersed in a polyethylene polymer. Samples D and E were made in a similar way as sample C with the exception that the ratio of Arnitel® M400 and masterbach SCC-77941 for the skin formulation was 4 to 1; the difference between samples D and E was their basis weight. Sample F was also made like sample C with the exception that the ratio of Arnitel® M400 and the masterbatch SCC-77941 for the skin formulation was 2 to 1. Finally, sample G was also made like sample C with the exception that the ratio of Arnitel® M400 to masterbatch SCC-77941 for the skin layer formulation was 8 to 7.

TABLE 1

| Sample ID | Basis weight g/m² | Tensile strength N/5 cm | Thickness μm | HH with Typar mBar | Pinhole #/2m² | MVTR g/m²/day | COF kinetic to steel |
|---|---|---|---|---|---|---|---|
| A | 14.4 | 20.7 | 20.7 | >200 | 0 | 1400 | |
| B | 15.6 | 18.3 | 18.3 | >200 | 0 | 1240 | 6.5 |
| C | 15.2 | 11 | 11 | >200 | 0 | 1230 | 0.43 |
| D | 13.7 | 15.3 | 15.3 | >200 | 0 | 1310 | 0.36 |
| E | 9.7 | 16.3 | 16.3 | >200 | 1 | 1440 | |
| F | 11.1 | 11 | 11 | >200 | 0 | 1420 | 0.38 |
| G | 10.9 | 10.3 | 10.3 | >200 | 0 | 1300 | 0.36 |

Example 2

In Example 2, the samples were produced in a similar way as Example 1 with the exception that they were cast directly on the chill roll without the need for a nonwoven carrier web. For all of the samples from this example the die gap was set at 0.4 mm. For all of the samples from this example the weight ratio between the core layer and the skin layers was again about 85:15. For all of the samples from this example the core layer was made with Arnitel® VT3108. For samples H, J, K, and L the formulation of the skin layers comprised Arnitel® EM400 and SCC-77941 masterbatch blended at respective ratios of 6:4, 1:1, 3:7 and 3:7.

TABLE 2

| Sample ID | Basis weight g/m² | Thickness μm | HH mBar | Pinhole #/2m² | MVTR g/m²/day | COF kinetic to steel |
|---|---|---|---|---|---|---|
| H | 13.3 | 11 | 174 | 0 | 1240 | 0.38 |
| J | 12.5 | 13 | >200 | 0 | 1210 | 0.41 |
| K | 15 | 17 | 169 | 0 | 635 | 0.57 |
| L | 13.1 | 15 | 182 | 0 | 605 | 0.54 |

Example 3

In Example 3, the film samples were produced in a similar way as Example 2. The die gap for all of the samples from this example was 0.4 mm. For all of the samples from this example the weight ratio between the core layer and the skin layers was again about 85:15. For all of the samples from this example the core was made with Arnitel® VT3108. For samples M and N the formulation for the skin layers of the film comprised Arnitel® VT3108 and a SCC-77941 masterbatch blended respectively at ratios of 9:1 and 1:1.

TABLE 3

| Sample ID | Basis weight g/m² | Thickness μm | HH mBar | Pinhole #/2 m² | MVTR g/m²/day | COF kinetic to steel |
|---|---|---|---|---|---|---|
| M | 11.2 | 9 | 167 | 0 | 1300 | 0.4 |
| N | 12.2 | 18 | 73 | 0 | 1330 | 0.36 |

Example 4

In Example 4, the film samples were produced in a similar manner as Example 2. For all of the samples from this example, the weight ratio between the core layer and the skin layers was again 85:15. For samples P and Q the core was made with Arnitel® VT3108. For samples P and Q the formulation for the skin part of the film comprised Arnitel® VT3108 and a polyethylene blended respectively at a ratio of 95:5 and 9:1. The polyethylene was a LLDPE, specifically Escorene LL-3003 LLDPE commercialized by ExxonMobil Chemical Company, 13501 Katy Freeway, Houston, TX 77079-1398 This LLDPE is a hexene-containing copolymer of ethylene sold as premium cast stretch film resin. The density of this LLDPE is reported as 0.9175 g/cc, the MFI or melt flow index as 3.2 g/10 min, and the melting point as 124 C. For sample R the core layer of the film comprised Arnitel® VT3108 while the skin layers comprised a 9 to 1 blend of Arnitel® EM400 and calcium carbonate masterbatch grade TPM14287 sold by Techmer PM, #1 Quality Circle, Clinton, TN 37716. This masterbatch TPM14287 comprises about 80% by weight of calcium carbonate dispersed into a polyethylene. For samples S and T the core layer of the film comprised Arnitel® VT3108 and a polyethylene known as Escorene LL-3003 blended at respective ratios of 9:1 and 8:2, while the skin layers comprised Arnitel® EM400 and TPM14287 masterbatch blended at respective ratio of 9:1 and 8:2. For the samples of this example the die gap was set at 0.8 mm.

TABLE 4

| Sample ID | Basis weight g/m² | MD Tensile strength N/5 cm | MD elongation % | CD Tensile strength N/5 cm | CD elongation % | Thickness μm | HH with Typar cm WH | Pinhole #/2m² | MVTR g/m²/day | COF kinetic to steel |
|---|---|---|---|---|---|---|---|---|---|---|
| P | 12 | 12.39 | 165 | 5.95 | 371 | 10 | >200 | 5 | 1420 | 8.67 |
| Q | 13.7 | 12.95 | 179 | 6.14 | 345 | 10 | >200 | 5 | 1470 | 6.93 |
| R | 12.8 | 12.47 | 169 | 7.07 | 481 | 10 | >200 | 1 | 1333 | 0.49 |
| S | 14.2 | 13.04 | 238 | 4.86 | 196 | 10 | >200 | 1 | 1220 | 0.51 |
| T | 10.7 | 13.7 | 193 | 3.81 | 81 | 10 | >200 | 3 | 1110 | 0.48 |

The results summarized in Tables 1-4 illustrate that the addition of calcium carbonate to the skin layer formulation lowers the film's coefficient of friction (compare, e.g., samples P and Q with sample R in Table 4). In fact, it was shown that adding as little as 10% of the calcium carbonate masterbatch to the skin layer formulation significantly lowered the film's coefficient of friction (see, e.g., sample M in Table 3). Furthermore, it was shown that the calcium carbonate rather than the polyethylene in the masterbatch is responsible for lowering the film coefficient of friction because adding only polyethylene to the hygroscopic polymer in the skin layer formulation failed to significantly reduce the film's coefficient of friction (compare, e.g., samples P and Q with sample R in Table 4). Thus, the addition of calcium carbonate to the skin layer formulation is responsible for the beneficial low coefficient of friction.

However, when the calcium carbonate masterbatch accounts for a large proportion of the skin layer formulation (i.e., 70%), this addition has an adverse effect on the breathability of the film (see, e.g., samples K and L in Table 2). If the calcium carbonate masterbatch containing about 20% of polyethylene is added at a maximum of 50% of the skin layer formulation, then the film exhibits good MVTR above 1000 g/m²/day and an advantageous basis weight of approximately 12 gsm (see, e.g., sample N in Table 3). Thus, although the addition of calcium carbonate to the skin layer formulation beneficially lowers the film's coefficient of friction, appropriate ranges for the amount of calcium carbonate masterbatch to be added to the skin layer formulation have been established to maintain the other advantageous effects of the film.

Example 5

In Example 5, the laminate samples were produced by adhering a film to a nonwoven using a discontinuous layer of adhesive. The film samples used in the laminate samples were produced in a similar manner as Example 2. Specifically, to form the laminate samples, the film samples were first extruded into the nip of a chill roll and a rubber roll. The nip pressure was set for 0.7 MPa. The chill roll had a very fine mesh pattern to provide a matte finish on the film and was cooled by circulating water that had a temperature ranging from 25-45 degrees Celsius. Next, a thin layer of hot melt adhesive was applied to the film samples using a spray system. The hot melt adhesive was TEP 903 hot melt adhesive from Bostik, 11320 W. Watertown Plank Road, Wauwatosa, WI 53226. The amount of adhesive applied to the film samples was controlled by the line speed and the RPM of the adhesive pump. The diameter of the adhesive strands depended on the die temperature, melt temperature, and the throughput and quantity of the process air. The adhesive strands distributed substantially uniformly in a particularly designed pattern onto the surface of the film samples. The film samples having a coating of adhesive on one side were put in contact with a 26 gsm blue spunbond layer to form a bilaminate nonwoven and film composite and passed through a pressure nip to achieve good adhesion. Finally, another thin layer of adhesive was applied to the other side of the film samples not having an attached nonwoven layer. This side of the film samples was contacted with a 15 gsm natural SMS to form a trilaminate composite with a monolithic film sandwiched between two nonwoven layers and passed through another pressure nip to achieve good adhesion. The trilaminate composite was then trimmed and sliced to a specified width to form finished composite roll goods.

For laminate sample U, the weight ratio between the core layer and the skin layers was 84:16. For laminate sample V, the weight ratio between the core layer and the skin layers was 70:30. For laminate sample W, the weight ratio between the core layer and the skin layers was 80:20. For all of the samples from this example, the core was made with Arnitel® VT3108. For sample U, the formulation for the skin layers comprised Arnitel® VT3108 and calcium carbonate masterbatch grade TPM14287 at a ratio of 9:1. For sample V, the formulation for the skin layers comprised Arnitel® VT3108 and calcium carbonate masterbatch grade TPM1.4287 at a ratio of 95:5. For sample W, the formulation for the skin layers comprised Arnitel® VT3108 and polyethylene at a ratio of 85:15.

Exemplary Embodiments

Having described various aspects and embodiments of the invention herein, further specific embodiments of the invention include those set forth below.

Certain embodiments according to the invention provide breathable multilayer films suitable for a wide variety of uses (e.g., protective apparel, surgical gowns, surgical drapes, aprons, roofing material, house wrap, etc.). In one aspect, the breathable multilayer film includes a monolithic core layer. In some embodiments, the monolithic core layer comprises at least one core-layer highly breathable polymer. In accordance with certain embodiments of the invention, the breathable multilayer film also comprises a first skin layer comprising at least one first-skin-layer highly breathable polymer, a first-skin-layer filler, and a first-skin-layer non-breathable material. In certain embodiments, the breathable multilayer film further comprises a second skin layer comprising at least one second-skin-layer highly breathable polymer, a second-skin-layer filler, and a second-skin-layer non-breathable material. According to certain embodiments, the multilayer film is co-extruded. In some embodiments, the multilayer film is monolithic. In certain embodiments, the multilayer film has a coefficient of friction less than 2. In other embodiments the multilayer film has a coefficient of friction less than 1. In certain embodiments, the multilayer film has an MVTR of at least 500 g/m²/day. In other embodiments, the multilayer film has an MVTR of at least 1000 g/m²/day. In certain embodiments, the multilayer film has a basis weight comprising from about 5 to about 20 gsm. In other embodiments, the multilayer film has a basis weight comprising from about 10 to about 15 gsm. In further embodiments, for instance, the multilayer film may have a basis weight comprising from about 11 to about 13 gsm.

In accordance with certain embodiments of the invention, such as those discussed in the preceding paragraph of this specification, the core layer has a core-layer thickness, the first skin layer has a first-skin-layer thickness, and the second skin layer has a second-skin-layer thickness. In such embodiments, the core-layer thickness is greater than each of the first-skin-layer thickness and the second-skin-layer thickness. Furthermore, the core-layer thickness is greater than an aggregate of the first-skin-layer thickness and the second-skin-layer thickness.

In certain embodiments, such as those discussed in any of the preceding paragraphs of this section (e.g., Exemplary Embodiments), the core layer has a top surface and a bottom surface, and the first skin layer is positioned above and at least one of proximate or adjacent to at least a portion of the top surface of the core layer. In such embodiments, the first skin layer is directly adjacent to the top surface of the core layer. Furthermore, according to certain embodiments, the second skin layer is positioned below and at least one of proximate or adjacent to at least a portion of the bottom

TABLE 5

| Sample ID | Basis weight g/m² ASTM D3776 | Tensile strength-MD N/50 mm EN 29073-3 | Peel CD-inner N/25 mm AATCC 136 | Peel CD-outer N/25 mm AATCC 136 | HH cm H2O EN 20811 | MVTR 32C × 50% RH g/m²/day ASTM E96D | pinhole #/10m² PGI-internal |
|---|---|---|---|---|---|---|---|
| U | 59.9 | 102.1 | 1.489 | 3.089 | 124 | 1686.1 | 0 |
| V | 58.2 | 101.7 | 1.455 | 2.566 | 120 | 2785.0 | 0 |
| W | 57.8 | 103.3 | 1.849 | 3.356 | 122 | 2250.5 | 0 | surface of the core layer. In such embodiments, the second skin layer is directly adjacent to the bottom surface of the core layer.

In accordance with certain embodiments of the invention, such as those discussed in any of the preceding paragraphs of this section (e.g., Exemplary Embodiments), the multilayer film comprises no more than 20% by weight of the first skin layer, the second skin layer, or an aggregate of the first skin layer and the second skin layer. In other embodiments, the multilayer film comprises no more than 15% by weight of the first skin layer, the second skin layer, or an aggregate of the first skin layer and the second skin layer. In further embodiments, the multilayer film comprises no more than 10% by weight of the first skin layer, the second skin layer, or an aggregate of the first skin layer and the second skin layer.

According to certain embodiments, such as those discussed in any of the preceding paragraphs of this section (e.g., Exemplary Embodiments), the core-layer highly breathable polymer is hygroscopic. In some embodiments, the core layer comprises at least about 50 wt. % of the core-layer highly breathable polymer. In other embodiments, the core layer comprises at least about 75 wt. % of the core-layer highly breathable polymer. In further embodiments, the core layer comprises at least about 80 wt. % of the core-layer highly breathable polymer. In such embodiments, the core-layer highly breathable polymer comprises at least one of a thermoplastic urethane, a polyether block amide copolymer, or a copolyester thermoplastic elastomer. In certain embodiments, the core-layer highly breathable polymer comprises a copolyester thermoplastic elastomer.

In certain embodiments, such as those discussed in any of the preceding paragraphs of this section (e.g., Exemplary Embodiments), the core layer is devoid of micropores. In other embodiments, the core layer and the first skin layer are devoid of micropores. In further embodiments, the core layer and the second skin layer are devoid of micropores.

According to certain embodiments of the invention, such as those discussed in any of the preceding paragraphs of this section (e.g., Exemplary Embodiments), the first-skin-layer highly breathable polymer, the second-skin-layer highly breathable polymer, or both are hygroscopic. However, in certain embodiments, the first skin layer, the second skin layer, or both are less hygroscopic than the core layer. Additionally, in some embodiments, the first skin layer, the second skin layer, or both are less tacky than the core layer.

In accordance with certain embodiments of the invention, such as those discussed in any of the preceding paragraphs of this section (e.g., Exemplary Embodiments), the first skin layer comprises about 30 wt. % to about 98 wt. % of the first-skin-layer highly breathable polymer. In other embodiments, the first skin layer comprises about 50 wt. % to about 98 wt. % of the first-skin-layer highly breathable polymer. In further embodiments, the first skin layer comprises about 90 wt. % to about 98 wt. % of the first-skin-layer highly breathable polymer. Furthermore, according to certain embodiments of the invention, the second skin layer comprises about 30 wt. % to about 98 wt. % of the second-skin-layer highly breathable polymer. In other embodiments, the second skin layer comprises about 50 wt. % to about 98 wt. % of the second-skin-layer highly breathable polymer. In further embodiments, the second skin layer comprises about 90 wt. % to about 98 wt. % of the second-skin-layer highly breathable polymer. In such embodiments, the first-skin-layer highly breathable polymer, the second-skin-layer highly breathable polymer, or both comprise at least one of a thermoplastic urethane, a polyether block amide copolymer, or a copolyester thermoplastic elastomer. In certain embodiments, for example, the first-skin-layer highly breathable polymer, the second-skin-layer highly breathable polymer, or both comprise a copolyester thermoplastic elastomer.

In certain embodiments, such as those discussed in any of the preceding paragraphs of this section (e.g., Exemplary Embodiments), the first-skin-layer filler is dispersed in the first skin layer. According to certain embodiments, the second-skin-layer filler is homogenously dispersed in the second skin layer.

In certain embodiments, such as those discussed in any of the preceding paragraphs of this section (e.g., Exemplary Embodiments), the first-skin-layer non-breathable material, the second-skin-layer non-breathable material, or both comprise a polyolefin polymer. In such embodiments, the first-skin-layer non-breathable material, the second-skin-layer non-breathable material, or both comprise a polyethylene polymer. In further embodiments, the first-skin-layer non-breathable material, the second-skin-layer non-breathable material, or both comprise a low density polyethylene, a linear low density polyethylene, a high density polyethylene, a copolymer or terpolymer of ethylene, a functionalized polymer of ethylene, or any combination thereof.

In certain embodiments, such as those discussed in any of the preceding paragraphs of this section (e.g., Exemplary Embodiments), the first skin layer comprises about 0.5 wt. % to about 15 wt. % of the first-skin-layer non-breathable material. In other embodiments, the first skin layer comprises about 0.5 wt. % to about 6 wt. % of the first-skin-layer non-breathable material. In further embodiments, the first skin layer comprises about 0.5 wt. % to about 3 wt. % of the first-skin-layer non-breathable material. According to certain embodiments, the second skin layer comprises about 0.5 wt. % to about 15 wt. % of the second-skin-layer non-breathable material. In other embodiments, the second skin layer comprises about 0.5 wt. % to about 6 wt. % of the second-skin-layer non-breathable material. In further embodiments, the second skin layer comprises about 0.5 wt. % to about 3 wt. % of the second-skin-layer non-breathable material.

In certain embodiments, such as those discussed in any of the preceding paragraphs of this section (e.g., Exemplary Embodiments), the first-skin-layer filler, second-skin-layer filler, or both comprise particles or aggregates of particles. According to certain embodiments, the first-skin-layer filler comprises a median particle diameter greater than the first-skin-layer thickness. Additionally, in certain embodiments, the second-skin-layer filler comprises a median particle diameter greater than the second-skin-layer thickness. In further embodiments, the first-skin-layer filler defines a plurality of protrusions on an outer surface of the first skin layer. In further embodiments, the second-skin-layer filler defines a plurality of protrusions on an outer surface of the second skin layer. In such embodiments, the first-skin-layer filler, the second-skin-layer filler, or both comprise organic particles, inorganic particles, or combinations thereof. In some embodiments, the first-skin-layer filler, second-skin-layer filler, or both comprise a polymer material having a melting point that exceeds the melting points of the core-layer highly breathable polymer, the first-skin-layer highly breathable polymer, and the second-skin-layer highly breathable polymer. In other embodiments, the first-skin-layer filler, second-skin-layer filler, or both comprise calcium carbonate, clay, talc, or any combination thereof. In further embodiments, the first-skin-layer filler, second-skin-layer filler, or both are calcium carbonate. In certain embodiments, the first skin layer comprises about 2 wt. % to about 40 wt. % of the first-skin-layer filler. In other embodiments, the first skin layer comprises about 3 wt. % to about 12 wt. % of the first-skin-layer filler. According to certain embodiments, the second skin layer comprises about 2 wt. % to about 40 wt. % of the second-skin-layer filler. In other embodiments, the second skin layer comprises about 3 wt. % to about 12 wt. % of the second-skin-layer filler.

In accordance with certain embodiments, such as those discussed in any of the preceding paragraphs of this section (e.g., Exemplary Embodiments), the breathable multilayer film comprises a monolithic core layer including a top surface and a bottom surface, a first skin layer positioned above and directly adjacent to the top surface of the core layer, and a second skin layer positioned below and directly adjacent to the bottom surface of the core layer. The monolithic core layer comprises from about 50 wt. % to about 100 wt. % of one or more core-layer highly breathable polymers in which the core-layer highly breathable polymer is hygroscopic. The first skin layer has a first-skin-layer thickness and comprises about 80 wt. % to about 98 wt. % of one or more first-skin-layer highly breathable polymers, about 1 wt. % to about 10 wt. % of a first-skin-layer filler, and about 0.2 wt. % to about 5 wt. % of at least one first-skin-layer non-breathable material. The first-skin-layer filler comprises particles or aggregates of particles having a first-skin-layer filler median particle diameter greater than the first-skin-layer thickness, and the first-skin-layer filler particles or aggregates of particles define a plurality of protrusions on an outer surface of the first skin layer. Additionally, the second skin layer has a second-skin-layer thickness and comprises about 80 wt. % to about 98 wt. % of one or more second-skin-layer highly breathable polymers, about 1 wt. % to about 10 wt. % of a second-skin-layer filler, and about 1 wt. % to about 5 wt. % of at least one second-skin-layer non-breathable material. The second-skin-layer filler comprises particles or aggregates of particles having a second-skin-layer filler median particle diameter greater than the second-skin-layer thickness, and the second-skin-layer filler particles or aggregates of particles define a plurality of protrusions on an outer surface of the second skin layer.

In another aspect, a laminate may be formed. The laminate may comprise a breathable multilayer film according to, for example, any one of the embodiments described in any of the preceding paragraphs of this section (e.g., Exemplary Embodiments), and at least one fibrous layer. According to certain embodiments, the fibrous layer comprises a woven material. Alternatively, in other embodiments, the fibrous layer comprises a nonwoven material. In such embodiments, the nonwoven material comprises at least one nonwoven web. In such embodiments, the nonwoven material comprises a spunbond layer. Alternatively or in addition, the nonwoven material comprises a meltblown layer. Alternatively or in addition, the nonwoven material comprises a sub-micron nonwoven layer. In certain embodiments, the breathable multilayer film and the fibrous layer are laminated via a discontinuous coating of adhesive. In such embodiments, the discontinuous coating of adhesive comprises a fiberized or nebulized hotmelt adhesive.

In certain embodiments, such as those described in the preceding paragraph of this specification, the laminate comprises an item of protective apparel or a portion thereof. In such embodiments, the item of protective apparel or portion thereof comprises a surgical gown, a surgical drape, or a protective apron. In other embodiments, the laminate comprises an item of industrial use or a portion thereof. In such embodiments, the item of industrial use or portion thereof comprises a roofing material or housewrap.

In another aspect, the invention provides a process for forming a breathable multilayer film, such as any breathable multilayer film described in this section (e.g., Exemplary Embodiments). In some embodiments, the process comprises co-extruding a multilayer film. According to certain embodiments, the process further comprises forming a core-layer polymer melt, forming a first-skin-layer polymer melt, co-extruding the core-layer polymer melt and the first-skin-layer polymer melt to form a monolithic core layer and a first skin layer, combining the co-extruded monolithic core layer and first skin layer to form a multilayer film, and laminating the multilayer film to a fibrous layer. In certain embodiments, the process further comprises forming a second-skin-layer polymer melt, co-extruding the core-layer polymer melt, the first-skin-layer polymer melt, and the second-skin-layer polymer melt to form a monolithic core layer, a first skin layer, and a second skin layer, combining the co-extruded monolithic core layer, first skin layer, and second skin layer to form a multilayer film, and laminating the multilayer film to a fibrous layer.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A process for forming a breathable multilayer film, comprising:
   (a) forming a core-layer polymer melt comprising at least one core-layer highly breathable polymer that is selectively permeable to water vapor and impermeable to liquid water;
   (b) forming a first-skin-layer polymer melt comprising (i) at least one first-skin-layer highly breathable polymer that is selectively permeable to water vapor and impermeable to liquid water, and (ii) a first-skin-layer filler;
   (c) forming a second-skin-layer polymer melt comprising at least one second-skin-layer highly breathable polymer that is selectively permeable to water vapor and impermeable to liquid water;
   (d) co-extruding the core-layer polymer melt, the first-skin-layer polymer melt, and the second-skin-layer polymer melt to form a monolithic core layer, a first skin layer, and a second skin layer; and
   (e) combining the monolithic core layer, the first skin layer, and the second skin layer to form the multilayer film;
   wherein the first skin layer comprises a first-skin-layer thickness and the first-skin-layer filler comprises a median particle diameter greater than the first-skin-layer thickness, and wherein the monolithic core layer is devoid of micropores.

2. The process of claim 1, wherein (i) the first-skin-layer polymer melt further comprises a first-skin-layer non-breathable material, (ii) the second-skin-layer polymer melt further comprises a second-skin-layer non-breathable material, or (iii) both (i) and (ii).

3. The process of claim 2, wherein (i) the first-skin-layer polymer melt comprises from about 0.5 wt. % to about 6 wt. % of the first-skin-layer non-breathable material, (ii) the second-skin-layer polymer melt comprises from about 0.5 wt. % to about 6 wt. % of the second-skin-layer non-breathable material, or (iii) both (i) and (ii).

4. The process of claim 2, wherein (i) the first-skin-layer filler comprises particles or aggregates of particles, (ii) the second-skin-layer polymer melt further comprises a second-skin-layer filler comprising particles or aggregates of particles, or (iii) both (i) and (ii).

5. The process of claim 4, wherein (i) the first skin layer comprises from 2 wt. % to 40 wt. % of the first-skin filler, (ii) the second skin layer comprises from 2 wt. % to 40 wt. % of the second-skin filler, or (iii) both (i) and (ii).

6. The process of claim 1, wherein the multilayer film has a coefficient of friction less than 1.

7. The process of claim 1, wherein the multilayer film has an MVTR of at least 8000 $g/m^2/day$.

8. The process of claim 1, wherein the core-layer polymer melt comprises at least about 80 wt. % of the at least one core-layer highly breathable polymer.

9. The process of claim 1, wherein the at least one core-layer highly breathable polymer comprises at least one of a thermoplastic urethane, a polyether block amide copolymer, or a copolyester thermoplastic elastomer.

10. The process of claim 1, wherein at least one of the first skin layer and the second skin layer are less hygroscopic than the monolithic core layer.

11. The process of claim 1, wherein at least one of the first-skin-layer filler defines a plurality of protrusions on an outer surface of the first skin layer and a second-skin-layer filler defines a plurality of protrusions on an outer surface of the second skin layer.

12. The process of claim 10, wherein the first-skin-layer filler, second-skin-layer filler, or both comprise organic particles, inorganic particles, or combinations thereof.

13. A process for forming a laminate, comprising:
(a) forming a multilayer film according to the process of claim 1; and
(b) bonding the multilayer film to a nonwoven layer.

14. The process of claim 13, wherein the nonwoven layer comprises a spunbond layer, a meltblown layer, or a combination thereof.

15. The process of claim 13, wherein bonding the multilayer film to the nonwoven layer comprises adhesively bonding the multilayer film to the nonwoven layer via a discontinuous adhesive layer.

* * * * *

UNITED STATES PATENT AND TRADEMARK OFFICE
CERTIFICATE OF CORRECTION

PATENT NO. : 12,466,169 B2
APPLICATION NO. : 17/981589
DATED : November 11, 2025
INVENTOR(S) : Rongguo Zhao It is certified that error appears in the above-identified patent and that said Letters Patent is hereby corrected as shown below:

In the Claims

In Column 27, Claim 4, Line 7 "The process of claim 2," should read --The process of claim 1,--

Signed and Sealed this
Thirtieth Day of December, 2025

John A. Squires
*Director of the United States Patent and Trademark Office*